United States Patent [19]

Gouw

[11] 3,882,063

[45] May 6, 1975

[54] METHOD OF PRODUCING UNIFORM FIBEROUS WEBS BY DRAWING PARTLY FUSED PARTICLES

[75] Inventor: Lam H. Gouw, Delft, Netherlands

[73] Assignee: Shell Oil Company, Houston, Tex.

[22] Filed: June 4, 1973

[21] Appl. No.: 367,019

Related U.S. Application Data

[63] Continuation-in-part of Ser. No. 184,561, Sept. 28, 1971, abandoned.

[30] Foreign Application Priority Data

Oct. 1, 1970 United Kingdom............ 46766/70

[52] U.S. Cl................... 264/24; 264/119; 264/126; 264/288; 264/291; 264/DIG. 47
[51] Int. Cl.......................... B29f 5/00; B29c 17/02
[58] Field of Search............ 264/24, 126, 288, 291, 264/DIG. 47, 165, 216, 119, 289

[56] References Cited
UNITED STATES PATENTS

| | | | |
|---|---|---|---|
| 2,960,727 | 11/1960 | Bradshaw et al. | 264/126 |
| 3,212,137 | 10/1965 | Lemettre | 264/126 |
| 3,400,186 | 9/1968 | Wiley | 264/165 |
| 3,488,411 | 1/1970 | Goldman | 264/24 |
| 3,555,136 | 1/1971 | Rouault | 264/126 |
| 3,619,460 | 11/1971 | Chill | 264/288 |
| 3,634,564 | 1/1972 | Okamoto et al. | 264/288 |
| 3,649,611 | 3/1972 | Okumura et al. | 264/288 |
| 3,697,475 | 10/1972 | Morris et al. | 264/288 |

*Primary Examiner*—Robert F. White
*Assistant Examiner*—James B. Lowe

[57] ABSTRACT

This invention relates to a process for the manufacture of fiberous webs, said process requiring neither an extrusion nor a fibrillation step. The process consists essentially of forming a sheet of partly fused particles and drawing the sheet so as to form a fiberous web. The fiberous webs are useful for manufacture of synthetic paper and yarn.

11 Claims, No Drawings

3,882,063

METHOD OF PRODUCING UNIFORM FIBEROUS WEBS BY DRAWING PARTLY FUSED PARTICLES

This is a Continuation-in-part of U.S. Pat. application Ser. No. 184,561 filed Sept. 28, 1971, now abandoned.

BACKGROUND OF THE INVENTION

Field of the Invention

The present invention relates to a process for the manufacture of fiberous webs.

Description of Prior Art

The production of fibers and webs of fibers has typically required one of the following three sets of well known steps;

1. spinning a filament, i.e., extrusion of a melt of plastic resin through a small hole, followed by drawing, 2. extruding a sheet, embossing, scoring or introducing voids into the sheet, followed by cold drawing (which is defined as the drawing of fiber or sheet below the melt or fusion point of the plastic resin so as to induce molecular orientation) to induce fibrillation, or 3. extruding a sheet, cold drawing, then fibrillating by applying a force transverse to the direction of orientation. All three of the above conventional processes require an extrusion step. Only 2 and 3 can produce fiberous webs and these two processes require a cold drawing step and a discrete post- or pre-cold drawing step in order to form a fiber. Each of the sets of steps described above can incorporate a melt drawing step (which is defined as drawing above the melt or fusion point of the plastic resin) before the cold drawing step. This melt drawing step is used to reduce the thickness of the filament or sheet and in the case of conventional sheet, will not lead to the formation of fibers without a subsequent cold drawing step.

The production of synthetic fibers by cold drawing extruded filament or fibrillation of cold drawn extruded sheet is widely applied. However, these operations have the disadvantage that the production rate per line is comparatively low because this rate is dependent on the extrusion step. Extrusion is a process of which the performance is greatly dependent on the conditions applied. Therefore, in many cases of actual practice, it is difficult to increase its speed, particularly in the processes employing stretched sheet or films. Furthermore, extrusion equipment is expensive and extrusion of fibers and films requires enough energy to melt and blend all of the plastic resin and form it into its continuous filament or sheet.

In the known processes for the production of fibers from fibrillated sheet various post- or pre-cold drawing steps are taken to induce fibrillation. Post drawing steps used to induce fibrillation include brushing the oriented film or passing air across the film transverse to the direction of orientation. The fibrillation is induced without this post drawing treatment by either introducing voids by puncturing or foaming the sheet or by embossing or scoring, then drawing the said treated sheet. Post drawing steps do not lead to uniform fiberous webs, however, the pre-drawing steps can be performed so as to lead to uniform fiberous webs.

There are known methods of producing plastic sheet and film which do not employ extrusion. For example U.S. Pat. No. 3,212,137 teaches a method for the production of continuous plane sheet by continuously supplying and compressing a layer of thermoplastic material between two moving faces while simultaneously producing a high frequency alternating electric field across the faces. Other known methods of producing sheet without extrusion are U.S. Pat. No. 3,488,411 which is directed toward product of foamed articles and sheet and U.S. Pat. No. 2,960,727 which is directed toward the production of sintered porous plastic sheet.

The process of drawing plastic filaments or sheet is well known and consists of pulling the sheet or filament through rollers at speeds faster than the sheet or filament is being fed to the rollers. When the drawing is done while a sheet or filament is molten it results in a reduction of thickness but no substantial increase in molecular orientation. Therefore, in the case of sheet, it is not the preferred method of producing fibers since it neither induces fibrillation nor is sufficient to lead to fibrillation upon subsequent brushing or air treating. When drawing is done while the sheet or filament is below its melting or fusion point it results in molecular orientation and an increase in the tensile strength in the direction of draw. In the case of sheet this orientation process, if coupled with a post drawing step like brushing or air treating or a predrawing step like embossing, U.S. Pat. No. 3,672,013, or foaming, U.S. Pat. No. 3,634,564, may be made to lead to a fiber or fiberous network.

SUMMARY OF THE INVENTION

A process for the preparation of uniform fiberous webs which comprises forming a sheet of partly fused plastic particles by uniformly depositing plastic resin particles on a surface which is heated to a temperature and for a period of time such that the particles are partly fused to each other. The sheet of partly fused particles is subjected to a drawing process which spontaneously converts it to a uniform fiberous web.

This invention has the heathertofore unknown advantages of forming fiberous webs without resorting to an extrusion step and without a discrete step to induce fibrillation. The elimination of the extrusion step allows a substantial increase in the rate of production. The direct formation of a discontinuous sheet of uniform partly fused particles results in the direct formation of a uniform fiberous web upon drawing. The process of the invention has the further advantage in that the plastic resin particles can be mixed with filler so as to produce a filled uniform fiberous web or a mixture of two types of plastic resin particles can be used to form a fiberous web of two kinds of fibers.

DESCRIPTION OF PREFERRED EMBODIMENTS

The sheet of partly fused particles from which the fiberous web is obtained by drawing is made in a number of ways. One way of making the sheet is to deposit powder of the thermoplastic resin onto a heated surface, from which the sheet can be removed easily. Such deposition may be effected by dropping the powder evenly on the surface, for instance by means of sieves or other suitable means of evenly distributing particles. In many cases it is advantageous to use a fluidized bed of powdered plastic resin or to employ a spray gun for the deposition of the particles. It is particularly preferred to deposit the powder on an endless moving belt or a rotating cylindrical drum by giving the powder particles an electric charge and grounding the belt or drum. The powder or particle size range is dependent on the denier of fiber desired and the draw ratio to be employed. Typical particle size may range from about 10 microns to about 500 microns. A preferred particle size is from about 10 microns to 250 microns. Larger particles can be used where webs of fine fiber are not the desired product.

In the case where the particles are deposited on a belt or drum, said belt or drum should be conductive, and suitable its surface is of a metal such as stainless steel, chrome-plated steel, or phosphorus bronze. In some cases it is found to be of advantage if the surface is covered by a suitable non-sticking coating layer, for example a belt or drum made of a teflon-covered metal. Although other methods of heating the particles upon or after deposition may be applied, in most cases it is efficient to heat the belt to a temperature high enough to cause the powder particles to at least partly melt, thus causing a particle to partly fuse to the particles with which it is in contact. It is preferred, however, that the heating step be controlled so that the particles of thermoplastic resin do not completely melt, and therefore the belt temperature is suitably controlled to avoid variance over a wide range. The heating is effected by induction, including high-frequency induction, infrared or laser beam heating. The temperature during the deposition and fusion step is dependent on the polymer used and the length of time heated but in general, the temperature of the belt or drum and oven is held at about 10°C–175°C above the Deflection Temperature of the polymer (as defined in ASTM Test Method D648, at 66 psi fiber stress), bearing in mind the polymer should not be allowed to degrade. The preferred temperature range for forming the sheet of partly fused particles is about 25°C–125°C above the Deflection Temperature, particularly preferred is the temperature range of about 50°–75° above the Deflection Temperature.

When using a moving surface such as an endless belt or rotating drum in operating the present process, in many cases the sheet of partly fused particles obtained is suitably removed from the surface by drawing at a speed higher than the linear speed of the surface. Drawing the molten or partially molten sheet of partly fused particles at its temperature of formation produces a uniform fibrous web. The difference in the speeds (draw ratio) depends on the size of the particles and the desired denier of the fiber, but in general the melt drawing speed differences range from about 5 to 75. The preferred speed differences are from about 10–45, particularly preferred speed differences are from about 15–25.

However, it is possible to produce a uniform fibrous web by first cooling the sheet of partly fused particle below its melting or fusion point, then drawing. The cold drawing step is dependent on the type of polymer and the desired result, i.e., denier, orientation or orientation plus fibrillations. Generally, cold draw ratios of from about 1:2 to about 1:15 are used. Preferred draw ratios are from 1:2 to 1:8, particularly preferred cold draw ratios are from 1:2 to 1:4.

A preferred method of drawing is to carry it out in steps, i.e., subject the fiberous web, whether drawn while above or below the polymer's melting or fusion point, to a final stretching step, carried out below the polymer's melting or fusion point. This final stretching step may be mono-axial, however, bi-axial stretching is possible and may be advantageous in the manufacture of certain end-products.

Less accurate temperature control is needed in another preferred embodiment of the present process, in which the sheet of partly fused particles to be drawn additionally contains a filler in an amount of up to 80 percent by weight of the thermoplastic resin; preferably in an amount of up to 40 percent by weight of the thermoplastic resin. In many cases the filler is suitably added to the thermoplastic resin, in bulk form or after being powdered, prior to the particle deposition. Preferred filler amounts are in general dependent on the nature of the filler.

Suitable fillers to be added to the polymer in bulk form, i.e., before being powdered, or to the polymer powder are, for instance, quartz, glass powder, clay, talc, carbonates such as calcium carbonate, or wood pulp. Fillers of this category are preferably employed in amounts of about 15–25 percent by weight of thermoplastic resin. Other fillers suitably used in certain cases are dye stuffs, metal oxides, or metal salts, while such oxides or salts containing crystal dye sites are sometimes particularly preferred, for instance $Al_2O_3 \cdot 3H_2O$. Preferred amounts of fillers of the last-mentioned category are about 0.5–5 percent by weight of thermoplastic resin.

In another preferred embodiment of the present process a powder consisting of particles of more than one thermoplastic resin is used to make the sheet of partly fused particles, which is to be converted into a fiberous web by drawing, thus yielding products comprising different fibers. Also in this embodiment the temperature is less critical. Of particular significance, for instance, is the embodiment wherein the temperature is held between the melting point of the lowest melting polymer and that of the next lowest melting one; no fusing of the different polymers to each other is encountered. Although the particles of the different polymers may be deposited simultaneously, it is in some cases preferred to deposit the polymers in powder form one after another from different fluidized beds or spray guns. In this procedure, the sequence of addition of powders from the highest to lowest melting point may be advantageous.

Additional optional ingredients may be applied in the present process such as chemical blowing agents or non-orientable low-melting thermoplastic polymer in particulate form, the latter being used as heat-bonding aids for the fibers in the resulting products. If such low-melting particles are employed, a very fine fiberous web is obtained, which if desired may be subjected to a post-treatment such as rubbing to separate the fibers from each other and to obtain fibers of an even lower denier.

In the above-discussed embodiments it is in some cases found advantageous to employ, instead of or in addition to the fillers, natural or synthetic fibers having a higher melting point than the thermoplastic base resin used. Mono-axially or bi-axially stretching of the sheet formed by fusing the deposited particles together yields in many cases non-woven fabrics, which are useful as such or for combination with conjugate layers by heat-bonding.

One of the additional advantages of the present process is the fineness of the fibers in the resulting products. In many cases these fibers are of lower denier than those obtained via the conventional film fibrillation route. Further, by using one or more suitable additives, as discussed above, fiberous webs or non-woven fabrics are obtained in a far simpler method than the conventional processes for manufacturing such structures. For film fibers such manufacture usually requires the subsequent steps of extrusion, cooling, stretching, fibrillation, carding and bonding. Moreover, blends of different types of fibers may be obtained in a way as simple as the manufacture of fibers from one base material and without requiring a separate blending step.

In the process of the invention, many thermoplastic resins are suitably used, for example homo- and copolymers of vinyl chloride, vinylidene chloride, vinyl acetate, acrylonitrile, polyesters, and polyamides. Preferred base resins are homo- and copolymers of lactones, in particular polypivalolactone, and those of mono-olefins such as ethylene and propylene. Low pressure polyethylene as well as polypropylene in all various known forms are particularly preferred starting materials.

The fibrous products obtained by the present process are used as such for various fiber applications, or may first be converted into staple fibers in any known manner, e.g., cutting or stretch-breaking.

Fibrous webs obtained by the present process have other important uses, for instance for packaging purposes or as material for disposable articles. A particularly suitable application of such fibrous web is synthetic paper, if necessary or desired after suitable coating and/or sizing. Such fibrous webs, after suitable grinding, and also the fibers as obtained by the present process, may also be advantageously employed in synthetic paper manufacture in another manner, namely as starting material for such manufacture, usually involving their use as suspension in an aqueous medium.

To illustrate the manner in which the invention may be carried out, the following Embodiments are given. It is to be understood, however, that embodiments are for the purpose of illustration and the invention is not to be regarded as limited to any of the specific materials or conditions used in the specific embodiments.

ILLUSTRATIVE EMBODIMENT 1

A mixture of 80 parts by weight of polypropylene powder of melt index (m.i.) 3.1 and 20 parts by weight of quartz powder was fluidized and electrostatically charged by means of electrodes placed in the fluidized bed. The voltage applied was 80kV. The powder mixture was deposited onto a heated, grounded, continuously moving belt of phosphorus-bronze metal covered with a teflon layer. The amount of the deposited powder was 200 gr/m$^2$. The distance between the top layer of the fluidized bed and the metal belt was 5 cm and the temperature of the belt was 180°C. After passing through a heating tunnel where the temperature was approximately 190°C, the polymer/filler sheet was then pulled off from the belt at a speed of 10 times the belt speed, and subsequently cooled in water. A network type of fibrous product was obtained, which was then longitudinally stretched at a ratio of 1:3 and wound up. The average denier of the filaments of the network was approximately 3 (g/9000m.).

ILLUSTRATIVE EMBODIMENT 2

A mixture of 70 parts of weight by polypropylene of m.i. 1.2 and 30 parts by weight of talc was fluidized, electrostatically charged, and deposited onto a teflon coated metal belt as described in Example 1. The voltage applied was 90kV. After passing through the heating tunnel the polymer/filler sheet was then pulled off from the belt at a speed of 30 times the speed of the belt. The network type of fibrous product obtained had an average denier of 3.5 for the individual filaments.

ILLUSTRATIVE EMBODIMENT 3

A mixture of 80 parts by weight of polypropylene of m.i. 1.2 and 20 parts by weight of talc was fluidized, electrostatically charged and deposited onto a teflon-coated metal belt as described in Example 1. The voltage applied was 90kV. The thickness of the powder layer was about 1 mm. After passing through a heating tunnel where the temperature was kept at approximately 185°C, the mixture was then pulled off from the belt at a speed of 45 times of the speed of the belt. The obtained fibrous product had the appearance of a non-woven.

ILLUSTRATIVE EMBODIMENT 4

A sheet of a powder mixture as described in Example 1 was cooled to solidification after passing through the heating tunnel. After being taken off from the belt the sintered powder mixture was slit into tapes of 3 cm wide, reheated and stretched in a hot air oven of approximately 165°C. The continuous fibrous product obtained had a network-like structure.

ILLUSTRATIVE EMBODIMENT 5

A mixture of 99 parts by volume of polypropylene powder of m.i. 1.2 and 1 part by volume of $Al_2O_3.3H_2O$ was fluidized, electrostatically charged at 70kV and deposited onto a stainless steel belt. The distance between the top layer of the fluidized bed and the belt was 5 cm. The temperature of the belt was between 180° and 190°C. The thickness of the powder layer was about 200 microns. After passing through a heating tunnel of which the temperature was approximately 190°C, the partially fused particles were cooled till 170°C and subsequently taken off from the belt at a speed of 15 times the speed of the belt. The obtained web was then cooled in water and, after being reheated till 100°C, mono-axially oriented at a ratio of 1:4. The obtained product had a network structure, the average denier of the individual filaments being approximately 1. Similar results are obtained when there is no filler used.

ILLUSTRATIVE EMBODIMENT 6

A mixture of high density polyethylene (density 0.96, m.i. 0.4) and $Al_2O_3.3H_2O$ in the ratio of 99:1 by volume, was fluidized and electrostatically charged at 70kV. The powder mixture was deposited onto an grounded, heated circular type of an embossed steel drum, coated with a 30 microns thick layer of teflon. The embossed surface consisted of a regular pattern of peaks. The distance between two peaks was 0.4 mm and the height of the peaks was 0.2 mm.

The temperature of the steel drum was 210°C before deposition of the powder mixture. After deposition, a pressure was applied on the molten powder mass by means of a pressure roll. The melt was subsequently cooled to 150°C with an air knife and taken off from the drum at a speed of 2 times the linear speed of the drum. The obtained product was oriented in the transverse direction at a ratio of 2:1 and in the longitudinal direction at a ratio of 1.5:1 at a temperature of 90°C.

A network-like product was obtained. Similar results are obtained when there is no filler used.

ILLUSTRATIVE EMBODIMENT 7

Fibers made according to Example 5 were cut to a staple length of 5 mm and added to a suspension of pine wood sulphate pulp in the ratio of 1:1 by weight. The mixture of fibers was milled in a Hollander during 20 minutes and subsequently diluted with water to a fiber concentration of 2 percent wt. A synthetic paper was obtained by pouring the fiber suspension on a screen of wire normally used for paper making, removing the majority of water by pressing the fleece obtained between felts, and drying under pressure at about 105°C.

I claim as my invention:

1. The process for the manufacture of uniform fiberous webs which essentially consists of;
   a. depositing particles of thermoplastic resin on a surface which is heated to a temperature and for a time sufficient to melt the particles to form a discontinuous sheet of partly fused particles, and
   b. drawing the sheet of partly fused particles to spontaneously convert to a uniform fiberous web.

2. The process of claim 1, in which the particles are electrostatically deposited onto the heated surface.

3. The process of claim 1, in which the drawing step is done while the sheet of partly fused particles is at the temperature of formation to form a uniform continuous web.

4. The process of claim 1, in which the sheet of partly fused particles is first cooled to a temperature below the melting or fusion point of the plastic resin, then drawn into a uniform fiberous web.

5. The process of claim 1, in which the sheet of partly fused particles is first drawn while the sheet is at the temperature of formation, then the resulting fiberous web cooled below the melting or fusion point of the plastic resin, and drawn further.

6. The process of claim 2, wherein the powder is deposited on an endless moving belt.

7. The process of claim 1, where the surface on which the thermoplastic particles are deposited is covered with a suitable non-sticking coating layer.

8. The process of claim 1, wherein said sheet of partly fused particles contains a particulate filler in an amount of up to 80 percent by weight of the thermoplastic resin.

9. The process of claim 8, wherein the filler is a member chosen from the group consisting of quartz, glass powder, clay, talc, carbonates, and wood pulp.

10. The process of claim 8, wherein the filler is a member chosen from the group consisting of a dye stuff, a metal oxide or a metal salt.

11. The process of claim 1, wherein a mixture of particles of more than one type thermoplastic resin is used.

* * * * *